United States Patent [19]

Steenhoek et al.

[11] 4,044,168
[45] Aug. 23, 1977

[54] FLAVORED FAT COMPOSITION

[75] Inventors: Arie Steenhoek, Barendrecht; Herman Olsman, Terborg, both of Netherlands

[73] Assignee: Lever Brothers Company, New York, N.Y.

[21] Appl. No.: 614,295

[22] Filed: Sept. 17, 1975

[30] Foreign Application Priority Data

Sept. 18, 1974 Netherlands .......................... 7412329

[51] Int. Cl.$^2$ .............................................. A23D 5/00
[52] U.S. Cl. .................................... 426/613; 426/589
[58] Field of Search ............... 426/534, 589, 601, 613, 426/652, 417

[56] References Cited

U.S. PATENT DOCUMENTS

| | | | |
|---|---|---|---|
| 2,865,763 | 12/1958 | Ferrara | 426/589 |
| 3,271,166 | 9/1966 | Van Leeuwen et al. | 426/613 |
| 3,560,220 | 2/1971 | Bangert et al. | 426/589 X |

*Primary Examiner*—Raymond N. Jones
*Assistant Examiner*—R. A. Yoncoskie
*Attorney, Agent, or Firm*—Michael J. Kelly; James J. Farrell; Melvin H. Kurtz

[57] ABSTRACT

The invention relates to fatty foodstuffs, particularly anhydrous frying fats containing phosphatides, proteinaceous material, preferably whey and/or skim milk powder and an ammonium salt, preferably ammonium adipate, for improving its browning characteristics upon frying.

The fatty foodstuff preferably further comprises citric acid or a citrate and calcium salts of lactic and glutamic acid for improving the flavor of gravy prepared from such fatty foodstuffs.

15 Claims, No Drawings

FLAVORED FAT COMPOSITION

The present invention relates to a fatty foodstuff with improved browning properties, particularly a substantially water-free frying fat that is suitable for frying meat and preparing gravy.

The fatty foodstuff of the invention comprises fat, phosphatides, proteinaceous material and an effective amount of an ammonium salt.

The proetinaceous material, which is of importance for providing a brown colour to the gravy prepared from the foodstuffs of the invention and to e.g. meat fried therewith preferably comprises whey powder and/or milk powder, particularly a mixture of whey powder and milk powder.

A suitable weight ratio of milk powder: whey powder can vary within the range of 2:1 to 1:10, particularly 1.5:1 to 1:5.

Whey powder is preferably used in an amount of 0-8% by weight, more preferably 0.1-5% by weight, particularly 0.3-1% by weight; milk powder, especially skim milk powder, in an amount of 0-2% by weight, more preferably 0.1-1.5% by weight; and phosphatides in an amount of 0.1-1.5% by weight, especially 0.3-1.0% by weight of the fatty foodstuff.

If desired, other salts may be present, e.g. common salt and/or phosphates.

Ammonium salts suitable for improving the aforementioned browning properties are for example amonium chloride, neutral or acid ammonium phosphate, and preferably ammonium adipate, particularly monoammonium adipate which salt not only provides an excellent brown colouring effect but moreover contributes to the piquant flavour of the gravy prepared from the fatty foodstuff of the invention.

Preferably an amount of 0.2-5 mg equivalent ammonium salt per 100 g fatty foodstuff is used.

Completely or substantially completely water-free fatty foodstuffs, such as liquid, pourable or plastic frying fats, are particularly important, because these products not only yield a gravy of better colour and taste than the corresponding water-containing products, such as butter and margarine, but moreover are non-spattering or at least substantially non-spattering during frying of meat and the preparation of gravy.

Although the addition of ammonium salts to frying fats that contain phosphatides and proteinaceous material leads to better brown colouring of the gravy prepared therewith, it can sometimes give rise to a somewhat decreased homogeneity of the gravy. When the fatty foodstuffs of the invention further comprise citric acid and/or a citrate, it has appeared that the aforementioned effect is generally at least substantially counterbalanced.

Furthermore the presence of both ammonium salt and citrate is extra positively appreciated in the assessment of the taste of the gravy prepared from the fatty foodstuff of the invention.

A suitable citrate is for example sodium or potassium citrate. Preferably an amount of citric acid and/or citrate is used corresponding with 0.5 to 15 mg equivalent per 100 g product. The term "mg equivalent" is used in this specification as defined in the acidimetry, which means that 1 mg equivalent citrate corresponds to $\frac{1}{3}$ millimole of the corresponding salt, 1 mg equivalent mono-ammonium salt to 1 millimole of the corresponding salt and 1 mg equivalent diammonium salt to $\frac{1}{2}$ millimole of the corresponding salt.

Preferably the weight ratio of the various additives is adjusted in such a way that the pH of the aqueous phase of a gravy prepared from the product of the invention is from 4.5-7, particularly 5 to 6.5. Preferably the fatty foodstuffs of the invention further comprise a flavouring amount of calcium salts of glutamic and lactic acid.

Although the corresponding alkali metal salts can also to some extent be effective in providing an attractive meaty flavour to the gravy prepared from the fatty foodstuffs of the invention, they can give rise to a clotty product, particularly when combined with the other additives. The calcium salts, however, hardly lump together and moreover provide a more attractive taste at comparable ingredient levels. Suitable proportions of glutamic acid salts are e.g. from 0.2-1% by weight, of lactic acid salts 0.1-1% by weight (calculated as dry salts) and preferably the weight ratio of glutamic acid salts to lactic acid salts is from 1:10 to 2:1.

The fat-insoluble ingredients e.g. proteinaceous material, ammonium salts and optionally the citric acid, citrates and other salts can be added to a fat blend as such, but preferably as a spray-dried mixture. Care should, however, be taken that any calcium salt is separately added and not spray-dried in admixture with other minor ingredients, otherwise lump formation during the preparation of gravy from the fatty foodstuff thus obtained can easily occur.

Since phosphatides are easily soluble or dispersible in fat, they similarly can be added to the fat blend as such.

In case Ca-salts are added to the slurry to be spray-dried the gravy prepared from the fatty foodstuff containing such a spray-dried mixture will give a sandy taste impression, at the same time adversely affecting the positive flavouring effect of other minor components.

The fat or fat blend to be used for the fatty foodstuff of the invention can be liquid, pourable or plastic at ambient temperature, i.e. 20°-25° C.

A suitable liquid oil can for example contain or consist of olive oil, sunflower oil, maize oil, wheat-germ oil, safflower oil etc. or any other oil that is liquid at ambient temperature. A pourable or pumpable fat can e.g. contain the aforementioned liquid oils in admixture with more solid fats, such as optionally hardened palm oil, coconut oil or palm kernel oil or hardened vegetable or animal oils. A plastic fat can be butter fat and/or any fat blend which in principle is suitable for margarine preparation, i.e. a fat blend having a slip melting point which is at most equal to body temperature.

The fatty foodstuffs can be prepared in the manner known per se, by adding to a liquid or melted fatty phase a mixture of flavouring and browning ingredients, cooling and working the mass e.g. in conventional Votator equipment. If desired, an inert disperse phase, such as gas or an aqueous phase, can be added to the mass before, during or after the cooling. The invention will now be illustrated with reference to the following Examples.

EXAMPLES I - IX

A slurry of non-fatty ingredients except calcium salts was spray-dried and the spray-dried mixture was slowly added together with the calcium salts to a liquid or melted lecithin-containing fatty phase.

The mixture was pumped through a cooling cylinder of a Votator and cooled to a temperature of 10 to 20° C, subsequently led through a resting tube of a Votator and finally packed. The following compositions were used, the quality of the product being rated as follows:

|   |   |
|---|---|
| + | satisfactory |
| ++ | good |
| +++ | very good |
| ++++ | excellent |

For comparison, experiments A and B show compositions and results obtained by products that do not fall within the scope of the present invention. (All amounts are given as % by weight).

|  | Control | | Examples | | | | | | | | |
|---|---|---|---|---|---|---|---|---|---|---|---|
|  | A | B | I | II | III | IV | V | VI | VII | VIII | IX |
| Groundnut oil | 17.6 | 17.6 | 17.2 | 16.5 | 17.2 | 16.5 | — | — | 15.7 | 16.5 | 15.7 |
| Palm oil | 24 | 30 | 30 | 30 | 30 | 30 | — | — | 30 | 30 | 30 |
| Coconut fat | 8 | 10 | 10 | 10 | 10 | 10 | — | — | 10 | 10 | 10 |
| Whale oil (hardened to a slip melting point of 37° C) | 32 | 40 | 40 | 40 | 40 | 40 | — | — | 40 | 40 | 40 |
| Sunflower oil | — | — | — | — | — | — | 96.7 | — | — | — | — |
| Butter fat | — | — | — | — | — | — | — | 96.5 | — | — | — |
| Whey powder | 0.8 | 0.8 | 0.8 | 0.8 | 0.8 | 0.8 | 0.8 | 0.5 | 0.8 | 0.8 | 0.8 |
| Milk powder | 0.2 | 0.2 | 0.2 | 0.2 | 0.2 | 0.2 | 0.2 | 0.5 | 0.2 | 0.2 | 0.2 |
| Water | 16 | — | — | — | — | — | — | — | — | — | — |
| Salt (NaCl) | 1 | 1 | 1 | 1 | 1 | 1 | — | 1 | 1 | 1 | — |
| Lecithin | 0.4 | 0.4 | 0.4 | 0.4 | 0.4 | 0.4 | 0.4 | 0.4 | 0.4 | 0.4 | 0.4 |
| Ammonium Chloride | — | — | — | — | — | — | 0.2 | 0.2 | — | — | — |
| Di-ammonium adipate | — | — | — | — | — | — | — | — | — | 0.4 | — |
| Monoammonium adipate | — | — | 0.4 | 0.4 | 0.2 | 0.2 | 0.2 | — | 0.4 | — | 0.4 |
| Tripotassium citrate | — | — | — | — | 0.2 | 0.2 | 0.8 | 0.2 | 0.7 | — | 0.7 |
| Citric acid | — | — | — | — | — | — | — | — | 0.1 | — | 0.1 |
| Calcium glutamate | — | — | — | 0.4 | — | 0.4 | 0.4 | 0.4 | 0.4 | 0.4 | 0.4 |
| Calcium lactate | — | — | — | 0.3 | — | 0.3 | 0.3 | 0.3 | 0.3 | 0.3 | 0.3 |
| Taste of gravy*) | + | + | ++ | +++ | ++ | +++++ | +++++++++ | | | | +++ |
| Brown colour of gravy | ++ | ++ | +++++ | +++++ | +++++ | +++++ | +++++ | +++++ | +++++ | +++++ | +++++ |

*)Gravy was prepared by slowly warming 43 g product (on the basis of fat) to 160° C, subsequently frying 100 g minced meat at approx. 140° C for 5 minutes, removing the fried minced meat and thereafter heating the fat to 170° C and quenching it with 80 ml tap water.

We claim:

1. An improved frying fat composition, suitable for the preparation of a gravy, comprising:
   a. fat, wherein said fat is present in said composition at a level of at least about 80 percent by weight,
   b. at least one proteinaceous material selected from the group consisting of whey powder and milk powder
   c. phosphatides, and
   d. an amount, effective to improve the browing of gravy prepared from said composition, of an ammonium salt.

2. The improved frying fat composition according to claim 1 further comprising a flavoring amount of at least one calcium salt of acids selected from the group consisting of glutamic and lactic acid.

3. The improved frying fat composition according to claim 1 wherein said proteinaceous material is a mixture of whey powder and milk powder 4. The improved frying fat composition according to claim 3 wherein the ratio of said milk powder to said whey powder in said mixture is about 2:1 to about 1:10.

5. The improved frying fat compositiion according to claim 1 wherein said ammonium salt is present in said composition at a level of about 0.2 to about 5 mg equivalents per 100 grams of said composition.

6. The improved frying fat composition according to claim 1 wherein said ammonium salt is ammonium adipate.

7. The improved frying fat composition according to claim 5 wherein said ammonium salt is ammonium adipate.

8. The improved frying fat composition according to claim 5 wherein said ammonium salt is monoammonium adipate.

9. The improved frying fat composition according to claim 1 further comprising at least one citrate compound selected from the group consisting of citric acid, sodium citrate and potassium citrate.

10. The improved frying fat composition according to claim 9 wherein said citrate compound is present in said composition at a level of about 0.5 to about 15 mg equivalents per 100 grams of said composition.

11. The improved frying fat composition according to claim 2 wherein said calcium salt of glutamic acid is present in said composition at a level of about 0.2 percent to about 1 percent.

12. The improved frying fat composition according to claim 2 wherein said calcium salt of lactic acid is present in said composition at a level of about 0.1 percent to about 1 percent.

13. The improved frying fat composition according to claim 2 wherein the salts are present as a mixture and the ratio of said calcium salts of glutamic acid to said calcium salts of lactic acid present in said composition is about 1:10 to about 2:1.

14. An improved frying fat composition, suitable for the preparation of a gravy, comprising
   a. fat, wherein said fat is present in said composition at a level of at least about 80 percent by weight,
   b. at least one proteinaceous material selected from the group consisting of whey powder and milk powder, wherein said whey powder is present in said composition at a level up to about 8 percent by weight, and said milk powder is present in said composition at a level up to about 2 percent by weight,
   c. about 0.1 to about 1.5 percent of phosphatide, and
   d. about 0.2 to about 5 mg equivalents per 100 grams of said composition of monoammonium adipate.

15. The improved frying fat composition according to claim 14 wherein said fat is a substantially water free liquid or plastic frying fat.

* * * * *